Figure 3:
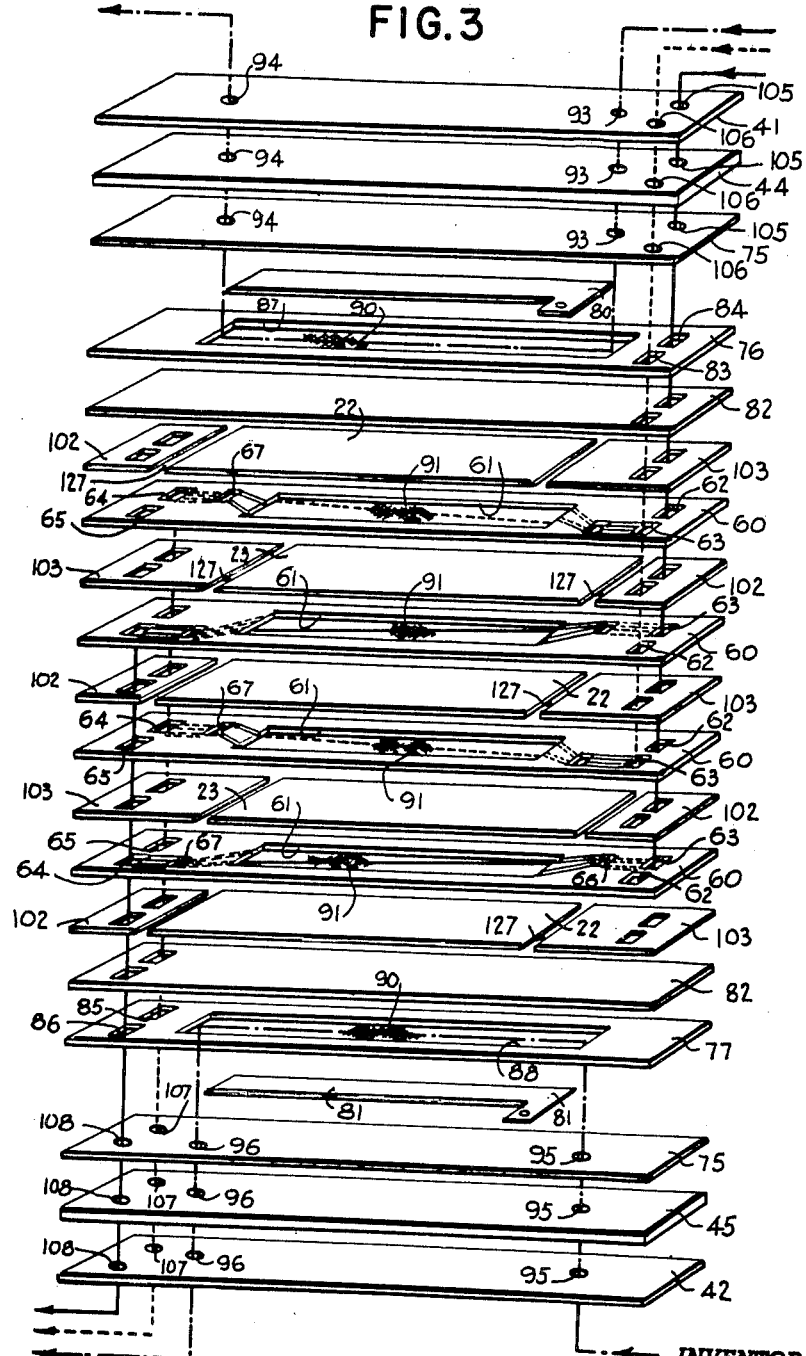

Feb. 15, 1966  B. M. ZWART, JR  3,235,481
SPACER GASKET
Original Filed July 25, 1960
7 Sheets-Sheet 1
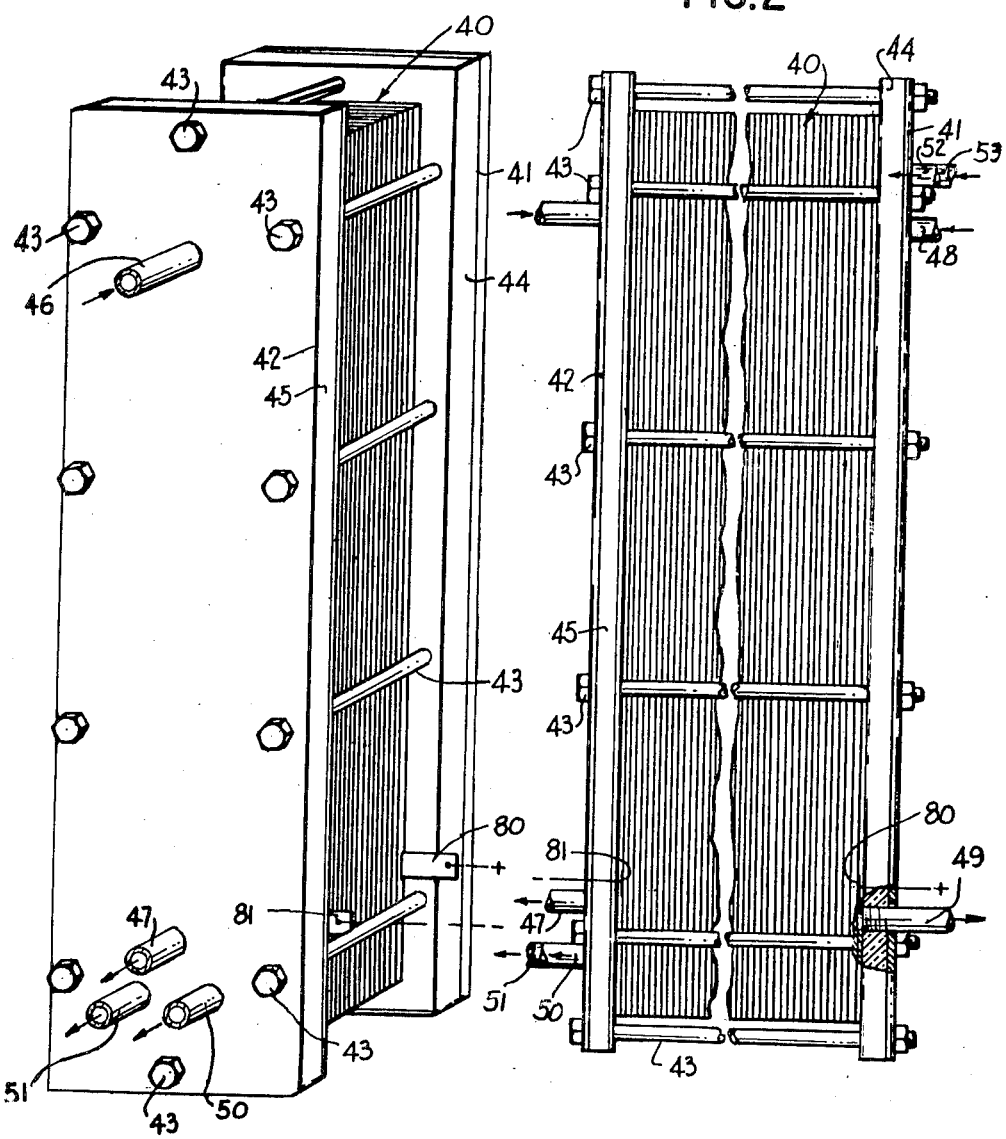
*INVENTOR*
BERNARDUS MULDER ZWART, JR.
BY
*William H. Drucker*
ATTORNEY Feb. 15, 1966  B. M. ZWART, JR  3,235,481
SPACER GASKET Original Filed July 25, 1960

7 Sheets-Sheet 2

INVENTOR.
BERNARDUS MULDER ZWART, JR.
BY
William A. Drucker
ATTORNEY

Feb. 15, 1966  B. M. ZWART, JR  3,235,481
SPACER GASKET
Original Filed July 25, 1960  7 Sheets-Sheet 3

INVENTOR.
BERNARDUS MULDER ZWART, JR.
BY

ATTORNEY

Feb. 15, 1966  B. M. ZWART, JR  3,235,481
SPACER GASKET
Original Filed July 25, 1960  7 Sheets-Sheet 4
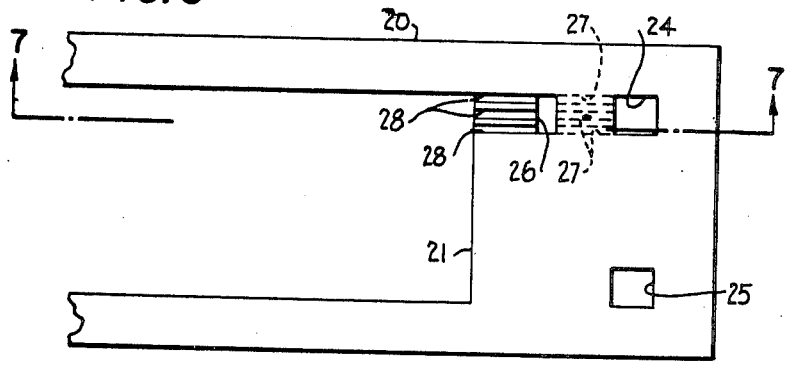
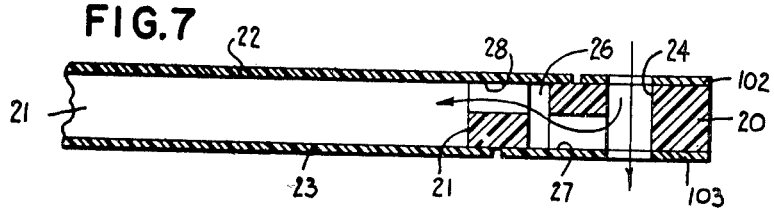
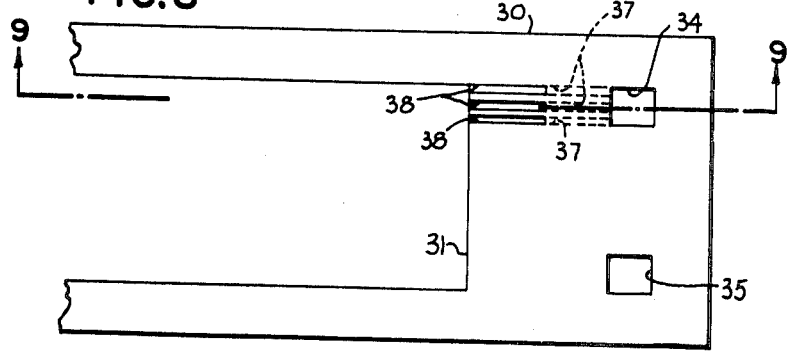
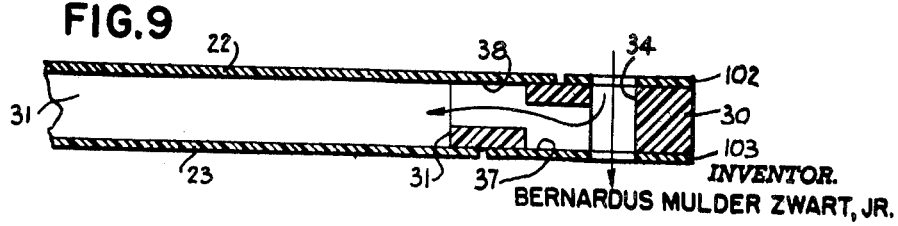
INVENTOR.
BERNARDUS MULDER ZWART, JR.
BY
William A. Drucker
ATTORNEY Feb. 15, 1966 B. M. ZWART, JR 3,235,481
SPACER GASKET
Original Filed July 25, 1960 7 Sheets-Sheet 5
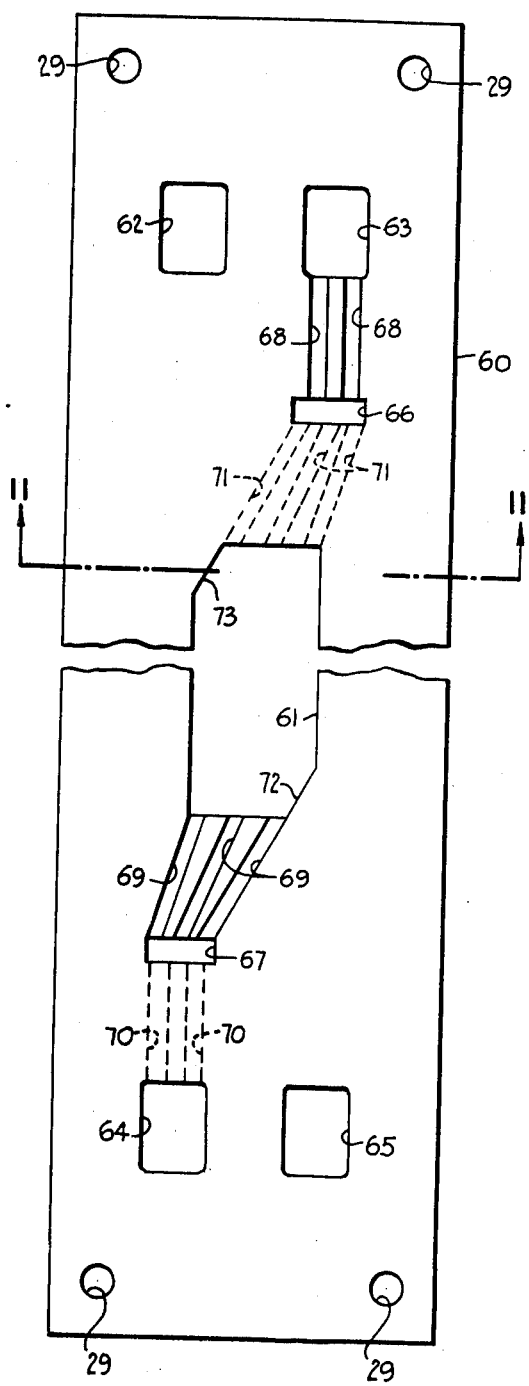
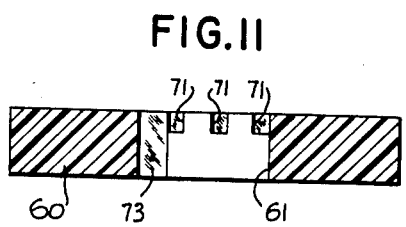
*INVENTOR.*
BERNARDUS MULDER ZWART, JR
BY
*William A. Drucker*
ATTORNEY

Feb. 15, 1966   B. M. ZWART, JR   3,235,481
SPACER GASKET
Original Filed July 25, 1960   7 Sheets-Sheet 6
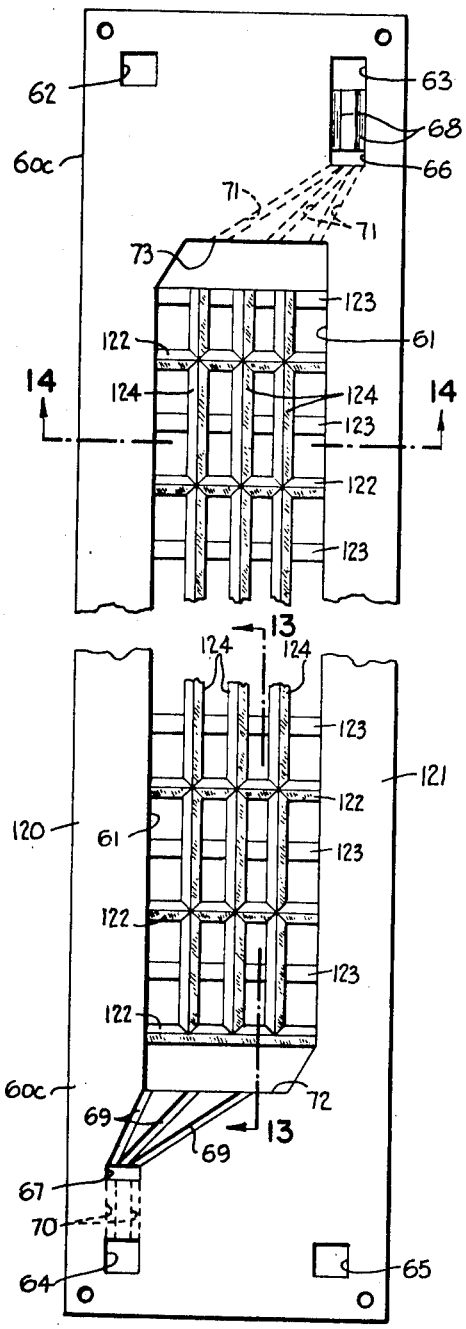
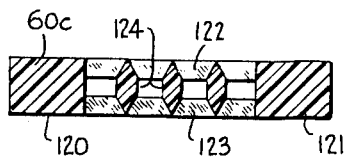
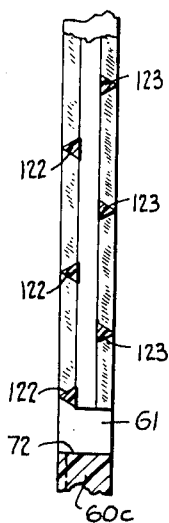
INVENTOR.
BERNARDUS MULDER ZWART, JR.
BY
William A. Drucker
ATTORNEY Feb. 15, 1966  B. M. ZWART, JR  3,235,481
SPACER GASKET Original Filed July 25, 1960  7 Sheets-Sheet 7

INVENTOR.
BERNARDUS MULDER ZWART, JR.
BY
William A. Drucker
ATTORNEY

United States Patent Office
3,235,481
Patented Feb. 15, 1966

3,235,481
SPACER GASKET
Bernardus Mulder Zwart, Jr., New Canaan, Conn., assignor to American Machine & Foundry Company, a corporation of New Jersey
Original application July 25, 1960, Ser. No. 45,105. Divided and this application Oct. 21, 1964, Ser. No. 417,257
3 Claims. (Cl. 204—301)

This is a division of application Serial 45,105 filed July 25, 1960.

This invention relates in general to fluid treatment devices and more particularly, to the construction of multiple chamber cell stacks.

For purposes of this invention, which equally applies to dialysis, electrodialysis is to be regarded as merely a special case of dialysis in which electric current flows. Electrodialysis apparatus, for example, may consist of stacks of alternating ion permeable membranes and gasket frame spacer elements which are clamped together. The membranes are thus positioned by the gaskets to form cells betwen adjacent pairs of membranes within cutout portions of the gasket frames. These gaskets may, for example, be between about 0.5 and 10 millimeters thick. A greater thickness would tend to space the membranes too far apart and would overly increase the electrical resistance within the stack while a lesser thickness would tend to space the membranes too close together which would overly increase the hydraulic resistance to fluid flow through the individual cells.

Cells of this type are usually manifolded by aligned apertures which form manifold passages through the stack of gaskets and membranes. If the appropriate intake and exhaust manifold passages are connected to particular cells by slots or grooves cut in the gaskets which communicate between the central cutout portions and the manifold apertures, a major disadvantage may result from such construction in that a membrane next to such a cutout may flex into the cutout portion of the gasket, as the membranes are thin and may be quite flexible. Such flexing into a slot allows fluid to flow past the edge of a membrane and behind it, between the membrane and an unslotted portion of an adjacent gasket. Since a cell stack in electrodialysis, for example, consists of an alternating series of diluting and concentrating cells, flexing of a membrane into a slot may allow some fluid from a given manifold to flow into the wrong manifold.

Another manner in which the manifold passages may be connected to the cutout portions forming the electrodialysis cells within the gasket is by providing internal passages within the gaskets leading from the manifold apertures to the cutout portion. These internal passages must be considerably less than the thickness of a gasket As an example, if the passages are 0.5 mm. in diameter in a gasket that is 1.0 mm. thick, the walls above and below the passages on each side of the gasket supporting a membrane are only 0.25 mm. thick and may flex inward to some degree permitting the membrane to flex correspondingly and allow slight leakage into the wrong cell or manifold passage. If the passages are reduced in size to allow a larger wall thickness in the gasket, the passages will offer a large hydraulic resistance to fluid flow through them. In addition, internal passages are diffcult to form within a gasket and may greatly increase the cost of fabrication of gaskets.

It is, therefore, a principal object of this invention to provide a stack gasket which may be inexpensively fabricated in a two-part mold or by other simple molding techniques and which will not allow cross leakage into adjacent cells.

Another object of this invention is to provide stack gaskets which present continuous sealing surfaces about the entire periphery of each cell.

A further object of this invention is to provide identical stack gaskets which can be used for alternate concentrating and diluting cells by inverting every other gasket.

Still another object of this invention is to provide a stack gasket frame having an integrally formed membrane spacer within its large central opening.

Yet another object of this invention is to provide a stack gasket having an integrally formed membrane spacer which may be formed in a two-part mold.

A still further object of this invention is to provide a stack gasket having an integrally formed membrane spacer which promotes turbulent flow through the cells.

Figure 4:
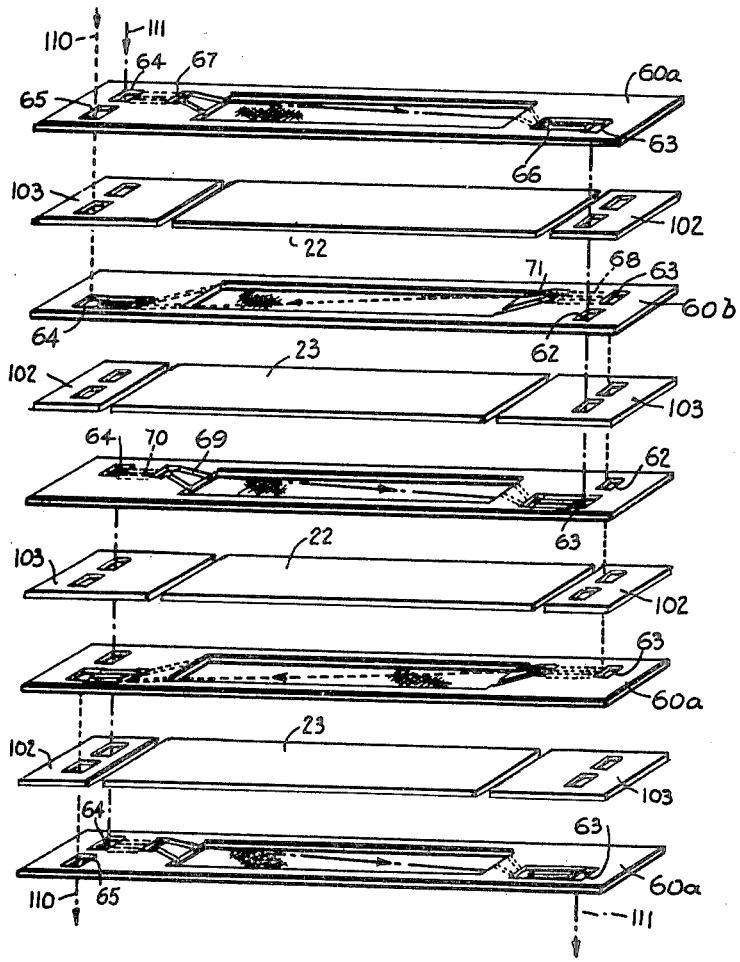
Figure 5:
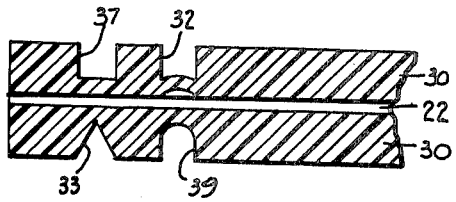
Figure 15:
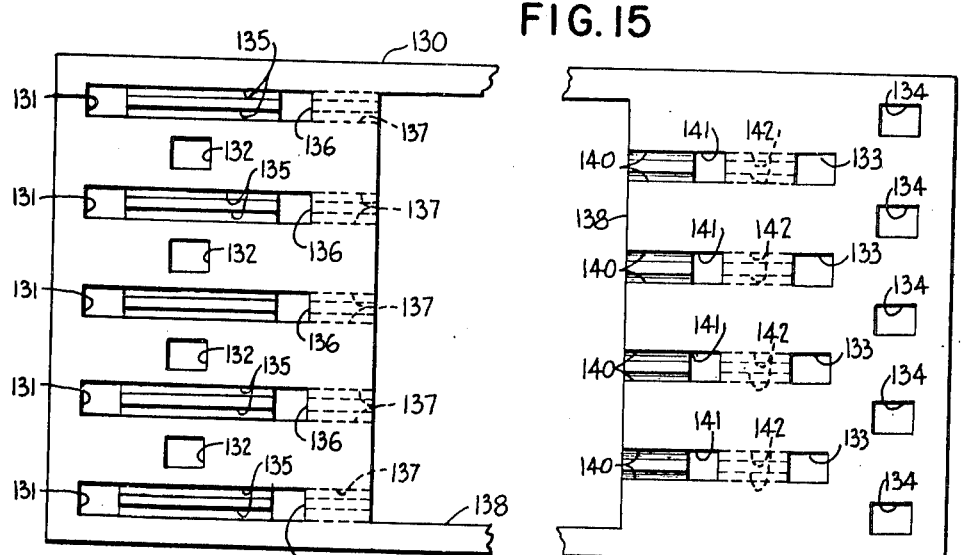
Figure 16:
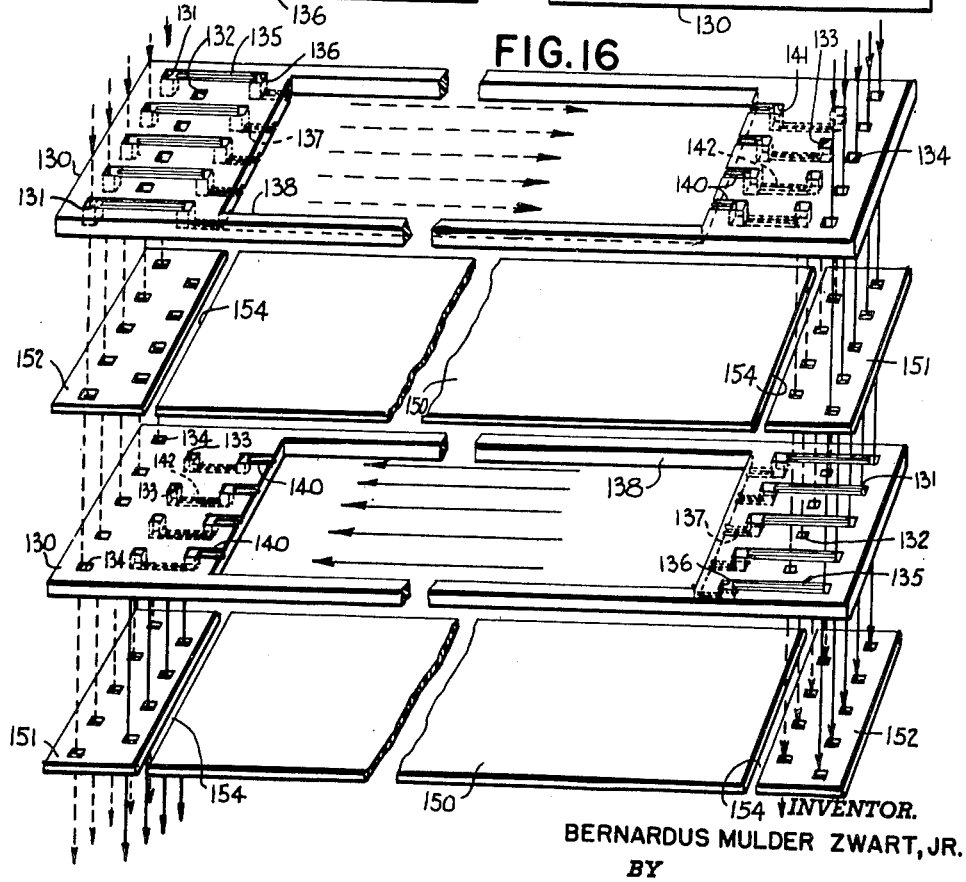

Many other objects, advantages, and features of invention reside in the construction, combination and arrangement of parts involved in the embodiments of the invention and its practice as will be understood from the following description and accompanying drawing wherein:

FIG. 1 is a perspective view of an electrodialysis stack;
FIG. 2 is a side view of an electrodialysis stack with a central portion broken away; and with a small additional portion broken away in section to show internal construction;
FIG. 3 is an exploded perspective view of the elements forming an electrodialysis stack, having parallel flow through it, according to this invention;
FIG. 4 is an exploded perspective view of the central elements forming an electrodialysis stack having series flow through it according to this invention:
FIG 5 is a cross-section through fragments of two adjacent stack gaskets showing the end of a membrane between them;
FIG. 6 is a plan view of a fragment of one end of a gasket forming a first embodiment of this invention;
FIG. 7 is a section taken on line 7—7 of FIG. 6 with membranes and end spacers shown in position on either side of the gasket;
FIG. 8 is a plan view of a fragment of one end of a gasket forming a second embodiment of this invention;
FIG. 9 is a setcion taken on line 9—9 of FIG. 8 with membranes and end spacers shown in position on either side of the gasket;
FIG. 10 is a plan view of a stack gasket with a central portion broken away forming a third embodiment of this invention;
FIG. 11 is a section taken on line 11—11 of FIG. 10;
FIG. 12 is a plan view of a stack gasket with its central portion broken away forming a fourth embodiment of this invention;
FIG. 13 is a section taken on line 13—13 of FIG. 12;
FIG. 14 is a section taken on line 14—14 of FIG. 12;
FIG. 15 is a plan view of a stack gasket with its central portion broken away forming a fifth embodiment of this invention; and
FIG. 16 is an exploded perspective view of the central elements forming an electrodialysis stack according to the fifth embodiment of this invention.

Referring to the drawing in detail, FIGS. 1 and 2 show an assembled electrodialysis stack, generally designated by the numeral 40, which is clamped between two steel end plates 41 and 42 which are drawn together as the bolts 43 are tightened. Heavier blocks of insulating material 44 and 45 may be disposed inside the end plates 41 and 42. It is to be noted that the steel end plates and the bolts 42 are thus disposed beyond the center of the stack 40 and electrically insulated from it. The end plate 42 and the block 45 have the cathode washing stream intake and exhaust pipes 46 and 47 extending into them, while the end plate 41 and the block 44 have the anode washing stream intake and exhaust pipes 48 and 49 fixed into them. The end plate 42 also receives the product stream pipe 50 and the concentrate stream pipe 51. In a like manner, the end plate 41 receives the two intake stream pipes 52 and 53. The pipes 46, 47, 48, 49, 50, 51, 52, and 53 of FIGS. 2 and 3 lead to apertures formed in the elements comprising the stack 40.

Referring to FIGS. 6 and 7, a first embodiment of this invention consists of an electrodialysis stack gasket 20 which is generally rectangular in shape and has a large central cutout portion 21 forming an electrodialysis cell between an anion permeable membrane 22 and a cation permeable membrane 23. In each end of the gasket 20 there are formed two manifold apertures 24 and 25. An aperture 26 is formed in each end of the gasket 20 between the large central opening 21 and a manifold passage 24. A first set of channels is formed by the grooves 27 which are formed on one side of the gasket 20 and communicate between the aperture 26 and the manifold aperture 24. Another set of grooves form the channels 28 on the other side of gasket 20 and extend between the central opening 21 and the aperture 26. Thus it may be seen that fluid within the manifold aperture 24 may flow through the channels 27, the aperture 26, and the channels 28 into the central opening 21. In the other end of each gasket 20 fluid may flow out of the central opening 21 into a manifold aperture 24.

Referring now to FIGS. 8 and 9, a second embodiment of this invention consists of a gasket 30 containing a large central opening 31 which forms an electrodialysis cell between the membranes 22 and 23. Manifold apertures 34 and 35 are formed at each end of the gasket 30. On one side of gasket 30 a series of grooves form the channels 37 which extend from manifold aperture 34 toward the large central opening 31. In the other side of the gasket 30 grooves form the channels 38 which extend from the large central opening 31 toward the channels 37. Since the channels 37 and 38 are formed in the gasket 30 to extend through more than one-half its thickness, fluid in the manifold aperture 34 may flow through the channels 37 into the channels 38 with which they communicate and then into the large central opening 31.

Referring now to FIGS. 10 and 11, a third embodiment of this invention consists of a gasket 60 which has the large central opening 61 formed in it. In one end of gasket 60 there is formed a pair of manifold apertures 62 and 63 and at the other end there is formed a pair of manifold apertures 64 and 65. The aperture 66 is formed in gasket 60 between the manifold aperture 63 and the central opening 61 and aperture 67 is formed between manifold aperture 64 and the central opening 61. On one side of gasket 60 there are formed the channels 68 extending between manifold aperture 63 and aperture 66 and there are also formed the channels 69 extending between aperture 67 and the central opening 61. On the other side of gasket 60 there are formed the channels 70 extending between the manifold aperture 64 and aperture 67 and there are formed the channels 71 extending from the central opening 61 to the aperture 66. The ends 72 and 73 of the central opening 61 have one side tapered in line with the divergence of channels 69 and 71 which fan outward as they extend from apertures 67 and 66. If fluid flows from manifold aperture 63 through the channels 68, aperture 66 and channels 71 into the central opening 61, the fanning out of channels 71 and the taper 73 will more evenly conduct fluid flow from the central opening 61. This feature tends to prevent any relatively stagnant areas from forming. Alignment apertures 29, which are shown in the gaskets 60, may be used to assist in the assembly of the gaskets into a stack.

Referring to FIG. 3, an assembled electrodialysis stack consists of the following elements. Between the metal end plates 41 and 42, there are the plastic insulating blocks 44 and 45 and the corrosion resistant sheets 75. Adjacent to upper and lower sheets 75, there is a top gasket 76 and a lower gasket 77. These gaskets contain no channels extending from their manifold apertures 83 and 84 or 85 and 86 to their large central openings 87 and 88. The electrodes 80 and 81 are disposed within the openings 87 and 88 and are connected to a suitable direct current source to form an anode and a cathode. Within the upper end plate 41, the insulating block 44 and the upper sheet 75, are formed the anode washing intake apertures 93 and the anode washing exhaust apertures 94. In a like manner, within the lower end plate 42, the insulating block 45 and the sheet 75, are formed the cathode washing intake and exhaust apertures 95 and 96. Therefore, fluid forced into the anode and cathode washing intake apertures 93 and 95 can only exhaust through the apertures 94 and 96. This flow removes undesirable materials which may be liberated at the electrodes 80 and 81 during operation of the stack.

Adjacent to the upper and lower gasket 76 and 77 are placed the porous mats 82 to protect adjacent membranes. Screen spacers 90 and 91, formed to conform to the large central openings 87, 88 or 61, may be placed within the gaskets 76 and 77 or the gaskets 60 to position adjacent membranes.

As many gaskets 60 may be assembled in a stack as is desired. Alternate gaskets 60 are inverted and alternately interspersed between adjacent gaskets are the anion permeable membranes 22 and the cation permeable membranes 23. Each anion permeable membrane 22 extends from between the apertures 67 and the manifold apertures 64 to between the large central opening 61 to between the apertures 66 and the manifold apertures 63 in adjacent gaskets 60.

Smaller and larger end spacers 102 and 103 are placed with a slight clearance next to the ends of the membranes 22 and 23. These end spacers are formed of a material of approximately the same thickness as the membranes 22 and 23 and they have apertures formed in them to correspond to the manifold apertures in the gaskets 60. Thus it may be seen that the ends of the membranes 23 are disposed between adjacent gaskets 60 on the opposite sides of these gaskets from the channels 69 and the channels 68. In a like manner, the membranes 22 lie between adjacent gaskets 60 disposed away from the channels 70 and the channels 71. Therefore, the periphery of each membrane 22 or 23 is clamped between solid portions of adjacent gaskets 60 and a continuous line of contact is maintained. Any leakage which might occur would only run out of the clearance 127 left between the membranes 22 and 23 and the end spacers 102 and 103 and thus could not contaminate adjacent cells.

Although the membranes 22 and 23 are shown used with end spacers 102 and 103, one piece membranes which extend entirely between adjacent gaskets 60 may be used if such membranes have corresponding manifold apertures formed in them. The cell stack shown in FIG. 3 operates in the conventional manner for parallel flow through a stack with the two intake streams flowing into the apertures 105 and 106 while a concentrating and a diluting stream or product stream flow out of the apertures 107 and 108.

While the grooves which form the channels in the gaskets in all three embodiments of the invention are shown as rectangular in cross-section, these grooves may be semicircular, U or V shaped to leave more material in the walls of the gasket and thereby give the individual gaskets greater strength. In the second embodiment of the invention as shown in FIGS. 8 and 9, the grooves must extend through more than one-half of the thickness of the individual gaskets. Since the end of each membrane is held between adjacent gaskets with sets of channels extending past the end of the membrane in the opposite sides of each gasket as shown in FIG. 5, the bottom of a rectangular channel 32 may flex upward allowing some leakage from the cells. The V shaped channel 33 and the U shaped channel 39 offer greater resistance to such flexing.

Referring now to FIG. 4, the central portion of a stack is shown assembled with gaskets 60a and 60b. The gaskets 60a are identical to the gaskets 60 with the manifold aperture 62 omitted and the gaskets 60b are identical to the gaskets 60 with the aperture 65 omitted. The gaskets 60a and 60b are assembled by stacking a first gasket 60a, a second gasket 60a inverted about its longitudinal axis, a gasket 60b, and a second gasket 60b inverted about its longitudinal axis. This pattern is repeated for as many gaskets as it is desired to assemble in the stack. Interspersed between the gaskets 60a and 60b are the alternate membranes 22 and 23 with their end spacers 102 and 103 in the same manner that has been described. Using this stack construction with gaskets 60a and 60b, series flow is provided in that each of the two inlet streams 110 and 111 is directed to flow through all the alternate cells in the stack. Since each alternate cell is a concentrating cell and each intervening cell is a diluting cell, one inlet stream will flow through all the concentrating cells while the other inlet stream flows through all the diluting cells.

FIGS. 12, 13, and 14 show a further modification of the invention. A gasket 60c is formed in the same manner as gasket 60 with the corresponding manifold apertures 62, 63, 64 and 65. The manifold apertures 63 and 64 are connected to the large central opening 61 by means of the passages 68 and 71 and the passages 69 and 70. However, extending between the side members 120 and 121 of gasket 60c there are formed the triangular cross pieces 122 and 123. The cross pieces 122 are disposed in approximately the top third or less of the frame, while the cross pieces 123 are disposed in the bottom third or less of the frame. Several members 124 which in cross section are rectangular with upper and lower triangular extensions, extend longitudinally through most of the length of the large central opening 61 between the upper members 122 and the lower members 123. The upper corners of the pieces 122 and 124 and the lower corners of the pieces 123 and 124 are given a slight radius so they will not abrade the membranes at their points of contact with them. The angular edges of the members 122, 123 and 124 tend to keep the flow through the opening 61 turbulent which increases the efficiency of the individual cells.

FIGS. 15 and 16 show an additional modification of this invention wherein a stack gasket 130 contains sets of manifold apertures 131, 132, 133 and 134. On one side of each gasket 130 grooves 135 extend from each of the manifold apertures 131 to corresponding apertures 136. On the other side of each gasket 130 grooves 137 are formed to extend from the apertures 136 to the large central opening 138. At the other end of each gasket 130 grooves 140 extend to the apertures 141 and grooves 142 formed in the other side of the gasket extend to the manifold apertures 133. The apertures 132 and 134 do not communicate with the central opening 138. This embodiment of the invention may be used in a similar manner to the first embodiment of the invention which is shown in FIGS. 6 and 7; however, a number of manifold apertures are disposed side by side in sets at each end of the gaskets 130. Fluid may flow from the manifold apertures 131 through the grooves 135, the apertures 136 and the grooves 137 into the central cut out portion 138 of the gasket. Fluid may then flow from the central cut out portion of 138 through the grooves 140, the apertures 141 and the grooves 142 into the manifold apertures 136.

Referring to FIG. 16, these gaskets 130 may be assembled into an electrodialysis stack with the interspersed holeless membranes 150A and 150C and the end spacers 151 and 152. Alternate gaskets 130 are rotated through 180 degrees about a vertical axis. If intake manifolds are connected to the electrodialysis stack to communicate with the manifold apertures 131 and 134, parallel flow will result in the stack as fluid within the manifold apertures 131 flows into the cut out portions 138 to exhaust through the apertures 133. The membranes 150A and 150C, which would respectively be anion and cation permeable membranes to form alternate concentrating and dilute cells, would be disposed so that their ends terminated between adjacent gaskets along surfaces of these gaskets which were disposed opposite grooves formed in the gaskets. Thus a continuous line of contact is maintained about the periphery of each membrane to seal it about the cut out portions 138 of each gasket. Thus leakage which might occur between a membrane 150A or 160C and an adjacent gasket 130 would only run out of the clearance 154 left between the membranes and the end spacers 151 and 152. The end spacers 151 and 152 are formed of a material of substantially the same thickness as the membranes 150A and 150C and they contain manifold apertures corresponding to those formed in the gaskets 130. This particular gasket construction provides a uniform flow across the width of the gasket from one end of the cut out portion 138 to the other.

What is claimed is:

1. In a dialysis cell stack comprising layers of membranes, and gaskets interspersed between the membranes, a gasket containing a large central opening, manifold apertures at each end of said gasket, and channels communicating between the central opening and at least two of the manifold apertures, a first set of cross members disposed toward one surface of said gasket, extending across the central opening, and narrowing as said first set of cross members approaches the surface of said gasket, and a second set of cross members disposed toward the other surface of said gasket extending across the central opening in said gasket, and narrowing as said second set of cross members approaches the other surface of said gasket.

2. The combination according to claim 1 wherein said first and second sets of cross members are staggered in relation to each other.

3. The combination according to claim 2 with the addition of longitudinal members disposed within the opening of said gasket, said longitudinal members extending between the first and second sets of cross members and tapering to edges even with the upper and lower surfaces of said gaskets.

References Cited by the Examiner

UNITED STATES PATENTS

| | | | |
|---|---|---|---|
| 2,891,900 | 6/1959 | Kollsman | 204—301 |
| 2,894,894 | 7/1959 | Kressman et al. | 204—301 |

WINSTON A. DOUGLAS, *Primary Examiner.*

JOHN H. MACK, *Examiner.*